United States Patent [19]

Miller et al.

[11] 4,300,167
[45] Nov. 10, 1981

[54] AUTOMATIC IRIS CONTROL SYSTEM

[75] Inventors: Frederick A. Miller, Santa Barbara; Edward A. Wooff, Jr., Ventura, both of Calif.

[73] Assignee: Circon Corporation, Santa Barbara, Calif.

[21] Appl. No.: 119,318

[22] Filed: Feb. 7, 1980

[51] Int. Cl.³ .............................................. H04N 5/30
[52] U.S. Cl. .................................. 358/210; 358/228; 352/141
[58] Field of Search ............... 358/217, 228, 210, 98; 352/141

[56] References Cited

U.S. PATENT DOCUMENTS

| | | | |
|---|---|---|---|
| 4,050,085 | 9/1977 | Prince et al. | 358/228 |
| 4,158,859 | 6/1979 | Kerbel | 358/228 |
| 4,190,864 | 2/1980 | Dischert | 358/228 |

Primary Examiner—Joseph A. Orsino, Jr.
Assistant Examiner—Edward L. Coles
Attorney, Agent, or Firm—Daniel J. Meaney, Jr.

[57] ABSTRACT

An automatic iris control system adapted to be connected between a video camera and optical input device which produces an optical image from a light directed upon and reflected from a subject wherein the optical image is directed onto the surface of an electronic imaging tube in the video camera and the optical image has a wide variation of reflected light due to variations in distance of the subject from the light source and wherein the automatic iris control system has an adjustable iris and drive motor located between the surface of the electronic imaging tube and optical input device for dynamically varying the intensity of the optical image applied to the electronic imaging tube of the video camera, a light intensity programming circuit for establishing a desired light intensity level on the surface of the electronic imaging tube of the video camera, and an automatic iris control circuit having a low gain amplifier, a weighted peak response detector, a comparator, a circuit for controlling current to the iris drive motor and a circuit for providing a feedback signal representing the direction in which the iris must be adjusted by the motor to control the light intensity on the surface of the electronic imaging tube of the video camera is shown.

12 Claims, 8 Drawing Figures

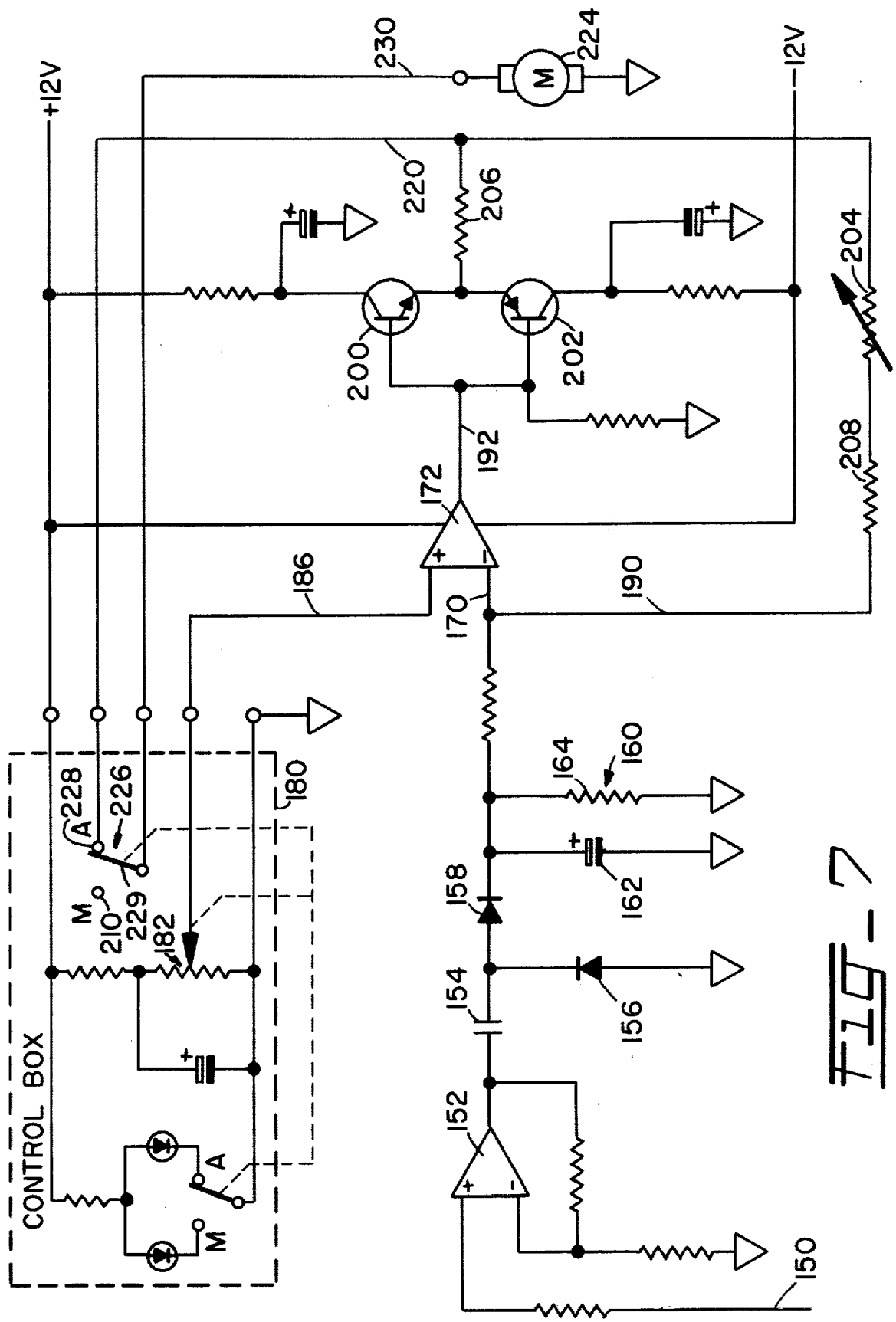

AUTOMATIC IRIS CONTROL SYSTEM

BACKGROUND OF THE INVENTION

1. Field of the Invention

This invention relates to an automatic iris control system to control the opening and closing of an adjustable iris to apply an optical image having a preselected light intensity level upon the surface of an imaging recording device and more particularly to an automatic iris control system having a feedback control circuit wherein a light intensity information signal is developed from a video signal produced by the video camera to dynamically adjust an iris in response to variations in the reflected light from a subject received by the optical input device to apply an optical image at a desired intensity level on the surface of an electronic imaging means of a video camera.

2. Description of the Prior Art

Use of an adapter with the automatic diaphragm setting iris is known in the art. The automatic diaphragm setting device known in the art includes a plurality of discrete settings which are adapted to change the light intensity of the image applied to a recording device such as a 16 mm camera. In operation, the automatic diaphragm is positioned between the camera and the input optical device and the reflected optical image is applied to a photo-conductive cell in the camera. The photo-conductive cell measures the light and, by means of an exposure control and intensification system, the photo-conductive cell controls a motor which operates the aperture diaphragm.

Another known adjustable iris system includes a manually adjustable iris wherein the operator manually adjusts the opening of the iris in order to manually set the intensity of the optical image being recorded by the camera.

It is also known in the prior art to use video sensing of the video information portion of a composite video signal to control light intensity. The known video sensing systems include detection circuits which are responsive to either peaks as average video signal information.

SUMMARY OF THE INVENTION

The present invention discloses a unique and novel automatic light intensity control system which, in its broadest aspect, is adapted to control an adjustable light intensity means located between an optical input device having a light source and a video camera. Typically, an optical device includes means for directing light upon a subject and produces a dynamic optical image having short durations of high intensity reflected light ("spikes") and variations in light intensity due to variations in distance of the subject from the light source. The variations in light intensity produce a video signal having a peak amplitude representative of the desired picture information excluding the spikes referred to herein as the video peak response. The video camera has an electronic imaging means which is adapted to have the dynamic optical image from the optical input device applied as an input to the surface of the electronic imaging means of the video camera. The video camera is responsive to the dynamic optical image applied to the electronic imaging means for producing a video signal which includes the spikes. An adjustable light intensity means which, in the preferred embodiment, is a rotatable adjustable iris assembly and its associated drive motor, is positioned between the video camera electronic imaging means and the optical input device. The adjustable light intensity means dynamically varies the intensity of the optical image which is applied to the surface of the video camera electronic imaging means. A light intensity level programming means is used for establishing a desired light intensity level at which the optical image is incident upon the surface of the electronic imaging means of the video camera and produces a command reference signal representative of the desired level. An automatic light intensity control circuit receives the video signal produced by the video camera. The automatic light intensity control circuit includes a low gain amplifying means, a weighted video peak response detector which is responsive to the amplified video information signal to produce a light intensity information signal having a level which is representative of the weighted peak average of the video information signal excluding the spikes, and a feedback circuit. The feedback circuit includes a comparator and a means for applying control current to the drive motor which moves the adjustable light intensity means. The comparator is adapted to receive the command reference signal from the light intensity level programming means and an input signal which represents the sum of the output from the weighted video peak response detector and a feedback signal developed by the feedback circuit. The feedback signal is a negative feedback signal which represents the voltage developed across the drive motor or similar actuating device. The comparator is responsive to the command reference signal and the input signal to produce a current control signal which has a predetermined magnitude and direction and for applying the current control signal to the means for applying the control current to the drive motor. The drive motor is responsive to the control current signal to position the light intensity means relative to the surface of the electronic imaging means to increase the light intensity of the optical image incident upon a surface of the electronic imaging means of the video camera when the light intensity information signal is less than the level of the command reference signal. Conversely, the drive motor positions the light intensity means relative to the surface of the electronic imaging means to decrease the light intensity of the optical image upon the surface of the electronic imaging means of the video camera when the level of the light information intensity signal is greater than the level of the command signal. The means for applying a control current to the drive motor produces a negative feedback signal which represents the magnitude and direction of the difference. Thus, the adjustable light intensity means is automatically adjusted to apply the optical image at substantially the same light intensity on the surface of the electronic imaging means of the video camera independent of the spikes due to reflected light from the subject.

The present invention overcomes several of the disadvantages of the prior art devices. In the photo-conductive cell detecting system, the light intensity of the optical image is used to control the opening of a diaphragm. The photo-conductive cell fails to make an adequate sample of light from the optical image in order to properly adjust the diaphragm opening in response to variations of reflected light from a subject. For example, if the camera is connected to a device such as to a beam splitter and endoscope which is used in medical surgery, the photo-cell does not receive the actual image at the recording surface of the film. In addition, as the endoscope is moved within a body, rapid changes occur in light intensity which may affect the light intensity at the surface of the film, but which would not be detected by the photo-conductive cell control.

Similarly, the use of a manually settable iris having a predetermined number of settings or which can be varied manually cannot be adjusted at a rapid enough rate to compensate for the rate of changes of reflected light from a subject. In the prior art video sensing devices, typically a video information signal has high spikes of short duration. Use of a detector which is responsive to the amplitude of the spikes results in the automatic control decreasing the intensity of the optical image to an undesired light level. Conversely, if the spikes are excluded and an averaging detector is used to average an entire scan line of video picture information, the average of the video signal from an input optical device is normally black increasing the intensity of the optical image to an undesired dark level.

The present invention overcomes several of the disadvantages of the known prior art devices. Specifically, the automatic light intensity adjusting means of the present invention may be used for automatically controlling light intensity means for any type of optical sensing systems, including objective lens, endoscopes, microscopes and other such optical devices.

The present invention discloses, in its preferred embodiment, an automatic iris control system which is adapted for use with endoscopes. Typically, an endoscope produces an optical image having a small area which, when imaged on the surface of an electronic imaging means of a video camera, does not fill the entire screen. Thus, if the video sensing means of the known prior art is used to sense the light intensity of the optical image, the large dark area surrounding the small area on the screen containing the optical image will cause improper averaging of the video information signal resulting in an extremely light image to compensate for the large black area surrounding the optical image. Conversely, if a spike sensing system of the prior art was used, the short duration, high intensity spikes produced in response to short durations of highly reflective light from a subject would cause the spike sensing system to average the video signal resulting in an adjustment in the video information signal which would cause the video image to be very dark.

One advantage of the present invention is that a unique weighting average video peak response circuit is utilized to sense the video information signal with a weighted video peak detector, which weighted video peak detector modifies the average of the signal by a time constant that ignores the spikes and controls the intensity level of the optical image imaging on the surface of the electronic imaging means of a video camera at a preselected intensity level.

Another advantage of the present invention is that a video level control means is provided to enable a user to selectively vary the light intensity of the optical image incident upon the electronic imaging means of a video camera enabling an automatic control of the light intensity at the selected light intensity level. Thus, an automatic adjustable iris would compensate for rapid variations in light intensity due to the ability of the automatic iris control circuit which has a feedback circuit as a part thereof, to obtain rapid adjustment of the light intensity means in response to rapid variations in light intensity received by the electronic imaging means of the video camera.

Yet another advantage of the present invention is that the automatic iris control system can be connected to a standard television recording system between a video camera and a video camera control circuit. Thus, it is unnecessary to modify the video camera or the recording device to provide for a means of monitoring the composite video signal.

A further advantage of the present invention is that a reversible motor can be used to drive the light intensity means which may be an automatically rotatable adjustable iris, or a variable density filter in the form of either a rotary or linear filter.

A yet further advantage of the present invention is that other forms of light intensity means may be used to control the light intensity such as polarized filters, electrical cells or liquid crystal devices.

A still yet further advantage of the present invention is that the electrical mechanical system can be suitably damped by use of viscous damping and error rate damping in the negative feedback signal to reduce under and overdamping. By using the teachings of the present invention, a negative feedback signal is used which compensates for the system damping characteristics to produce optimum damping characteristics which enables the automatic control circuit and the feedback loop to respond rapidly to rapid variations in the light intensity which dynamically occur in the optical image.

BRIEF DESCRIPTION OF THE DRAWINGS

These and other advantages and objects of the present invention will become more apparent when considered in light of the description of the preferred embodiment set forth herein which includes reference to the following drawings wherein:

FIG. 7 is a schematic diagram of a preferred embodiment of an electrical circuit used for the automatic iris control system.

DESCRIPTION OF THE PREFERRED EMBODIMENT

Figure 1:
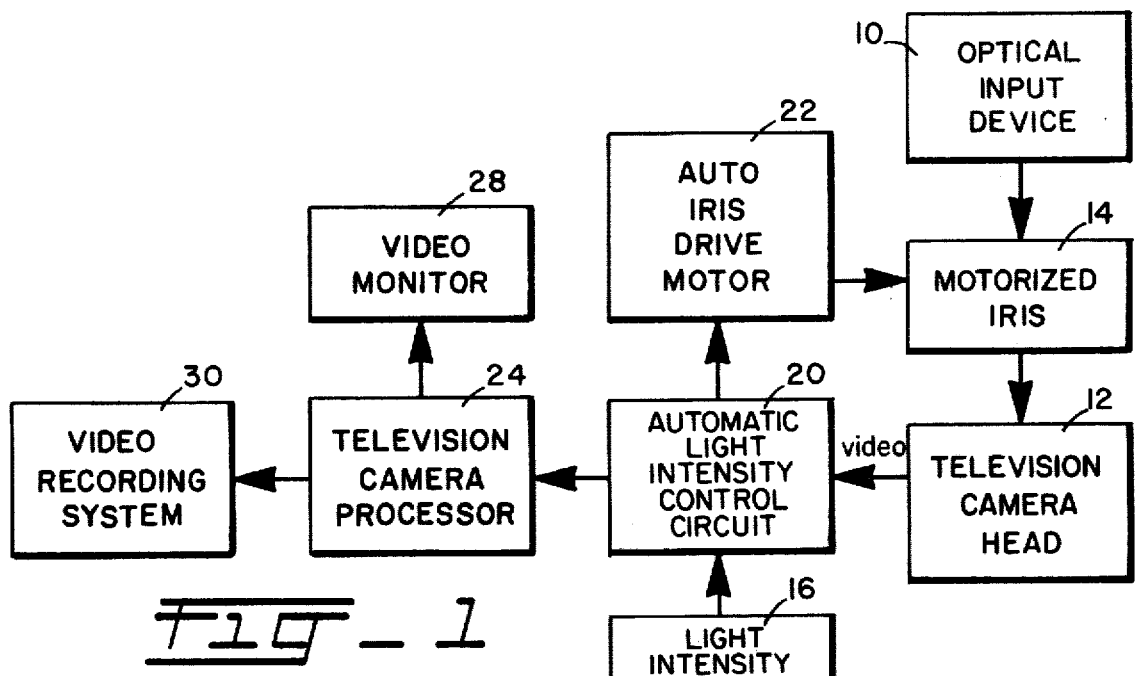
FIG. 1 is a block diagram of a system utilizing the automatic iris control system of the present invention.

FIG. 1 is an automatic light intensity control system which utilizes the teaching of the present invention. An optical input device 10 having a light source is adapted to direct light upon a subject. Typically, the optical input device could be a medical instrument such as, for example, an endoscope. The optical input device 10 produces a dynamic optical image which may have short durations of high intensity of reflected light from a subject or spikes, and variations in light intensity due to variations in distance of the subject from the light source.

In the preferred embodiment, a video camera head, which in this embodiment is a television camera head 12 having an electronic imaging means, is adapted to have the dynamic optical image from the optical input device 10 applied to the electronic imaging means thereof. The camera head 12 produces a video signal which includes spikes. An adjustable light intensity means 14, which in the preferred embodiment is a rotatable adjustable iris having a drive motor, is positioned between the camera head 12 and the optical input device 10. The adjustable iris 14 dynamically varies the intensity of the optical image which is applied to the surface of the television camera head electronic imaging means.

A light intensity level programming means 16 is provided for establishing a desired light intensity level at which the optical image is incident upon the surface of the electronic imaging means of the video camera. The light intensity level programming means 16 produces a command reference signal which is representative of the desired video level of the television camera head 12.

An automatic light intensity control circuit 20 receives a video signal produced by the camera head 12. The details of the automatic light intensity control circuit 20 are illustrated and discussed in connection with FIGS. 6 and 7. The automatic iris control circuit 20 controls a drive motor 22 which is operationally connected to and forms part of the adjustable iris 14.

The automatic iris control circuit is interconnected between the television camera head 12 and a television camera processor unit 24. In the television system described herein, the television camera head 12 produces unprocessed video signals and is directly connected to the television camera processor unit 24 to produce a composite video signal as an output therefrom. However, it is understood that a video camera can be an integrated unit which includes an electronic imaging means, video camera head and video processing circuits to produce a composite video signal. In this embodiment, the automatic light intensity control means 20 is interconnected between the television camera head 12 and a television camera processor unit 24. The output of the television camera processor unit may be applied to a video monitor 28 or recorded directly on a video recording system 30.

Figure 2:
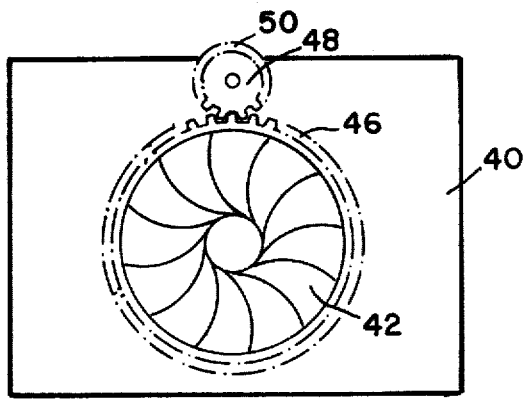
FIG. 2 is a diagrammatic front view of an adjustable rotatable iris assembly.

FIG. 2 shows one embodiment of an adjustable rotatable iris having a drive motor connected thereto. The adjustable iris has a housing 40 which supports a rotatable iris 42. Rotatable iris 42 has a plurality of teeth around the periphery thereof shown generally as 46. The teeth 46 located thereon on the periphery of the rotatable iris 42 mesh and engage with a drive gear 48 which likewise has a plurality of teeth 50 located around the periphery thereof. The friction of the gear drive and other components introduces a damping characteristic into the system.

Figure 3:
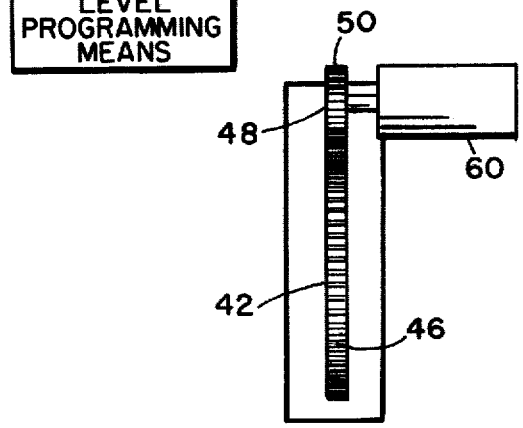
FIG. 3 is a diagrammatic representation of an end view of an adjustable rotatable iris assembly, drive gear and an associated drive motor.

FIG. 3 illustrates the rotatable iris 42, the teeth 46 located around the periphery thereof, drive gear 48 and teeth 52. The drive gear 48 is operationally connected to a drive motor 60. The drive motor 60 is controlled by means of applying a control current of a predetermined magnitude and direction to the motor. Thus, the motor 60 is a bi-directional motor and is capable of rotating the iris 42 between an open position and a closed position.

Figure 4:
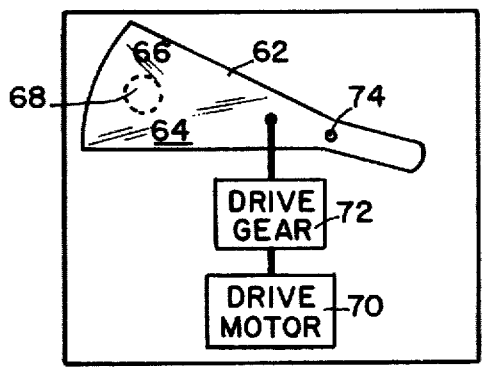
FIG. 4 is a diagrammatic view of a variable density shutter which may be used for the light intensity control means.

FIG. 4 shows another embodiment of a light intensity means. In the preferred embodiment, a wedge-shaped light intensity means 62 having areas of variable intensity which varies from a relatively light intensity shown generally as area 64 to a heavy dark intensity area shown generally as area 66. A dashed circle 68 generally represents the shape of an optical image developed from an optical input device 10, which in the preferred embodiment, is an endoscope. A drive motor 70, which can be in the form of a meter movement, moving claw or other such element, is connected to a drive gear 72, which may be either a rotary or linear drive gear, for selectively moving the light intensity means 62 about its pivot point 74.

It is envisioned that any number of known light control means may be used in practicing the invention.

Figure 5:
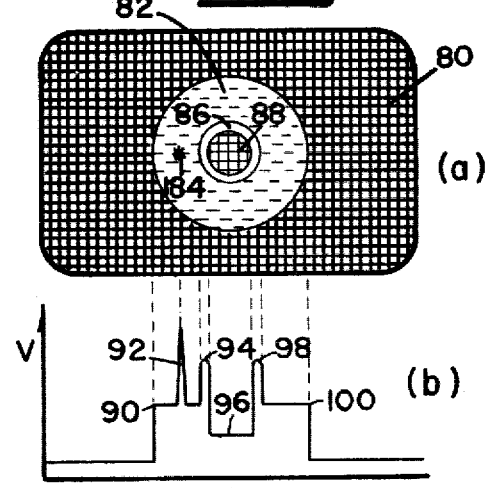
FIG. 5A is a diagrammatic representation of a video frame having an optical image from an endoscope and FIG. 5B is a waveform of the video signal for one horizontal scan line of the video frame in FIG. 5A.

FIG. 5A illustrates a frame of a video signal having an optical image from an endoscope appearing thereon. The outer area 80 is very dark because the optical image from the endoscope does not fill the frame. In the optical image illustrated in FIG. 5A, a light area 82 appears around the edge having a spike image 84 and with a brighter annular shape portion 86 followed by a dark area 88.

FIG. 5B is a waveform of the voltage of the video signal for one horizontal scan line which is typically of a duration of about 63 microseconds and having about 57 microseconds of video picture information. The balance of about 6 microseconds of time is used for blanking signals, synchronizing signals, color burst information signals and the like. The first peak 90 of the waveform represents the boundary of the light area 82. The spike 92 corresponds to the spike image 84. The raised amplitude pulses 94 and 98 correspond to the annular ring area 86 in FIG. 5A and the decreased trough 96 corresponds to dark area 88 in FIG. 5A. The peak amplitude 100 represents the boundary of light area 82.

In the present invention, spike 92 is ignored. The weighted video peak signal is set for peak 90 and 100. The weighted peak response circuit described in FIGS. 6 and 7 compensates for pulses 94 and 98 and depression 96.

The range of voltages over which the light intensity lever can be set can be as high as the voltage amplitude of pulses 94 and 98 or as low as the voltage amplitude of trough 96.

Figure 6:
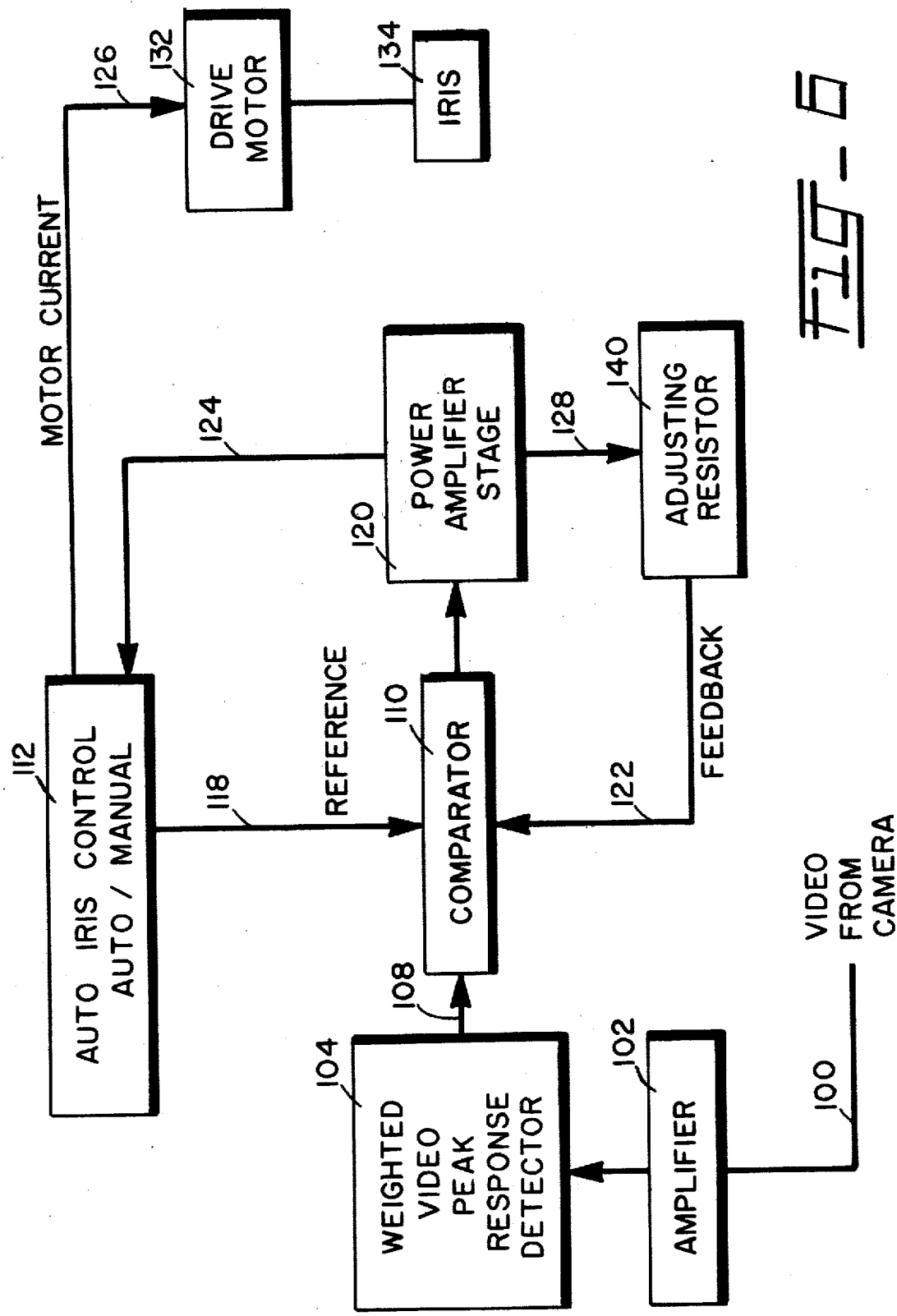
FIG. 6 is a block diagram of the preferred embodiment of an automatic iris control system using the teachings of the present invention.

FIG. 6 shows, by means of a block diagram, the details of automatic light intensity control circuit for practicing the teaching of the present invention. The video signal from a video camera or a video camera head is applied by input 100 to a low gain amplifying means 102. The low gain amplifying means 102 amplifies the video information signal portion of the video signal to raise the level of the signal so the same can be processed by the balance of the circuitry. The amplified video information signal is applied to a weighted video peak response detector 104 which produces a light intensity information signal having a level which is representative of the weighted peak average of the video information signal excluding the spikes. The output of the weighted video peak response detector is applied to a comparator 110. Another input to comparator 110 is from a light intensity level programming means 112 which includes means for establishing a voltage which represents a desired light intensity level at which the optical image is incident upon the surface or electronic imaging means of the video camera and for producing a command reference signal. In addition, a negative feedback signal 122 is applied to the comparator 110.

The comparator 110 forms part of a feedback circuit. Comparator 110 inputs include input 118 which has the command reference signal applied thereto, input 108 which is the light intensity information signal received from the weighted video peak response detector 104 and a feedback signal 122 which is produced by the feedback circuit. The output of comparator 110 is a current control signal which appears on output 126. Output 126 is an input to a means for applying a control current such as a power amplifier stage 120 which applies a control current of a predetermined magnitude through lead 124, an auto-iris control 112 and lead 126 to a drive motor 132. The drive motor 132 is operatively coupled to a rotatable adjustable iris assembly 134 having a known viscous damping characteristic for the feedback circuit. A feedback signal from power amplifier stage 120 appears on lead 128. The feedback signal 128 is applied to an adjusting resistor 140 to adjust for variations in viscous damping and error rate damping, to produce a negative feedback signal appearing on lead 122. The negative feedback signal is developed from the back EMF of the drive motor 132.

FIG. 7 shows the schematic diagram of a circuit for carrying out the teaching of the present invention. A video signal, which may be obtained at any point in the video processing system, appears on lead 150 and is supplied as an input to a low gain amplifier 152. The output of the low gain amplifier 152 is coupled to coupling capacitor 154 and is used as an input to voltage doubling diodes 156 and 158 which are operationally connected to the output of the low gain amplifying means 152. When amplified video information signals are passed by the low gain amplifying means 152, and through the voltage doubling diodes 156 and 158, a direct current voltage is applied to filter network 160. Filter network 160 has a capacitor 162 and a resistor 164 electrically connected in parallel to form a weighted averaging circuit having a preselected time constant determined by the RC time constant characteristics of capacitor 162 and resistor 164. The filter network 160 integrates the direct current voltage to produce an integrated analog voltage signal which is used as the light intensity information signal and is representative of the weighted peak intensity of the video information signal developed from the optical image by electronic imaging means of the video camera. The voltage signal representing the light intensity information signal appears on lead 170 and is used as part of the one input to a comparator 172 which is in the form of a differential amplifier. A second input to comparator 172 is from a light intensity level programming means shown by dashed box 180 which produces a voltage level which is representative of a desired light intensity at which the optical image is applied to the surface of the electronic imaging means of the video camera. The light intensity level programming means includes a settable, variable voltage divider 182 which has a selected range of voltages. An operator can adjust the variable voltage divider to develop a selected direct current voltage within the range of voltages which is representative of the desired light intensity level to be established by the automatic light intensity control circuit. The output of the variable voltage divider is supplied by a lead 186 as the input to comparator 172. The command reference voltage signal which appears on input 186 is the reference voltage for the differential amplifier comparator. A feedback signal appearing on a lead 190 is summed with the light intensity information signal appearing on lead 170 and the summed signal is the input signal appearing on the other input to comparator 172. The output of comparator 172 appears on lead 192 in the form of a current control signal. The current control signal is applied as an input complimentary output driving transistor amplifier having an NPN transistor 200 and a PNP transistor 202. The base of each transistor 200 and 202 is connected through a base resistor 201 to a ground. The control current developed thereby is applied to the drive motor 224 via a current limiting resistor 206, lead 220, control 180 and lead 230 to actuate the drive motor 224 in a predetermined direction to adjust the light intensity means in the direction required to obtain the desired light intensity on the surface of the electronic imaging means of the video camera. In the embodiment illustrated in FIG. 6, when transistor 200 is rendered conductive, the drive motor operates to open the iris to increase the light intensity. When transistor 202 is rendered conductive, the drive motor is driven in a backward direction to cause the rotatable adjustable iris to reduce its opening thereby reducing the light intensity on the surface of the electronic imaging means. The feedback voltage which appears on lead 190 is the back EMF of drive motor 224 and is applied, in the preferred embodiment, through a fixed resistor 208 and a variable resistor 204 to compensate for the viscous damping and error rate damping to produce the feedback signal on lead 190. The current developed by transistors 200 or 202 is applied by a lead 220 through an override circuit 226, which is connected via lead 230 to the drive motor 224. The drive motor 224 is rendered operative to rotate the iris in a selected direction until the desired light intensity level is obtained at the surface of electronic imaging means of the video camera. By use of the override control circuit 226, the control switch 229 can be moved from the automatic position 228 to a manual position 210 to permit the operator to override the operation of the automatic light intensity control circuit and to adjust the light intensity independent thereof.

If desired, the adjustable iris mechanism and its associated drive motor can be located remotely from the automatic light intensity control system in order to permit the electronics to be separated from the controlled iris device.

Typically, in an operating room environment, the endoscope is operationally connected to a beam splitter such that an image is split into two components, one of which is directed to the input of a video camera and the other of which is directed to an eye piece such that a surgeon performing an operation can view the patient. The adjustable iris assembly and its drive motor can be physically positioned between the beam splitter and the input of the video camera. The electronics which control the drive motor to rotate the iris can be located remotely from the immediate area where the surgery is being performed.

The teaching of this invention has wide application for both medical use and industrial use. It is envisioned that the adjustable iris and the associated automatic iris control system can be used for both conventional film recording or for video film recording of images developed from any number of optical input devices including, without limitation, endoscopes, microscopes, beam splitters, or other similar applications. Typically, in such uses, the intensity of the optical image presented to the surface of the electronic imaging means of the video camera would be subject to "burn-out" due to the presence of a large amount of light impinging the surface of the electronic imaging means.

In applications where the optical image fills only part of a frame of a video camera or video recording system and the optical image has wide variations in light intensity, such as is the case in the use of an endoscope or other medical instruments, such applications are ideal for use of an automatic light intensity means control system. The preferred embodiment of the automatic iris control system is one method for controlling the light intensity of the optical image incident upon the surface of an electronic imaging means of a video camera when the video camera is used in conjunction with other optical input devices and affords an operator an opportunity to manually set the light intensity level of the optical image at any desired level to accentuate any desired part of the optical image.

What is claimed is:

1. An automatic light intensity control system comprising
    an optical input device having a light source which is adapted to direct light upon a subject to produce a dynamic optical image having spikes of short durations of high intensity of reflected light and variations of light intensity due to variations in distance of the subject from the light source;
    a video camera having an electronic imaging means adapted to have said dynamic optical image from the said optical input device applied as an input to the surface of said electronic imaging means of said video camera, said video camera being responsive to the dynamic optical image applied to said electronic imaging means for producing a video signal which includes a video information signal having said spikes of short durations of high intensity of reflected light from the subject;
    an adjustable light intensity means including a drive motor positioned between said video camera electronic imaging means and said optical input device to dynamically vary the intensity of the optical image applied to the surface of said video camera electronic imaging means;
    a light intensity level programming means for establishing a desired light intensity level at which said optical image is incident upon the surface of said electronic imaging means of the video camera and for producing a command reference signal; and
    an automatic light intensity control circuit for receiving the video signal produced by said video camera, said automatic light intensity control circuit including
        a low gain amplifying means responsive to the video information signal to produce a low level amplified video information signal having the spikes as a part thereof;
        a weighted video peak response detector responsive to the amplified video information signal to produce a light intensity information signal having a level which is representative of the weighted peak average of the video information signal excluding the spikes; and
        a feedback circuit including a comparator and means for applying a control current to said drive motor of the adjustable light intensity means, said comparator being adapted to receive as input signals thereto a command reference signal from the light intensity level programming means the light intensity information signal and a negative feedback signal, said comparator being responsive to the input signals for producing as an output therefrom a current control signal of a predetermined magnitude and direction and for applying said current control signal to said means for applying a control current to said drive motor to cause said drive motor to position said light intensity means relative to said surface of said electronic imaging means to increase the light intensity of the optical image incident upon the surface of the electronic imaging means of the video camera when the level of the light intensity information signal is less than the level of the command reference signal and to position said light intensity means relative to said surface of said electronic imaging means to decrease the light intensity of the optical image upon the surface of the electronic imaging means of the video camera when the level of the light information intensity signal is greater than the level of the command reference signal and to produce a negative feedback signal representing the magnitude and direction of said difference, said feedback circuit producing said control current signal in a magnitude and direction to dynamically control the direction and position of the drive motor to adjust the light intensity means to apply the optical image at substantially the same preselected light intensity on the surface of the electronic imaging means of the video camera independent of variations of reflected light from the subject.

2. The automatic light intensity control system of claim 1 wherein said adjustable light intensity means is an adjustable rotatable iris driven by said drive motor through a gear mechanism.

3. The automatic light intensity control system of claim 1 wherein said adjustable light intensity means is a variable density filter.

4. The automatic light intensity control system of claim 1 wherein said light intensity level programming means includes
    a settable variable voltage divider having a selected range of voltages operatively connected to the input of said comparator to apply a selected direct current voltage within said range of voltages representing a desired light intensity level to be established by said automatic light intensity control circuit; as a command reference signal; and
    an override control operatively connected directly to said means for applying a control current to said drive motor to enable direct control of the light intensity means positioned relative to said surface of said electronic imaging means of said video camera independent of said automatic light intensity control circuit.

5. The automatic light intensity control system of claim 1 wherein said weighted video peak response detector comprises
    a voltage doubler operatively connected across the output of said low gain amplifying means for doubling the magnitude of the amplified video signal and for converting the video information signal to a direct current voltage; and
    a filter network including a capacitor and resistor electrically connected in parallel and having a selected time constant characteristic, said filter network being adapted to integrate the direct current voltage to provide an integrated analog voltage signal as the light intensity information signal representative of the weighted peak intensity of the video information signal of the video signal developed from said optical image by said electronic imaging means of said video camera.

6. The automatic light intensity control system of claim 1 wherein said comparator is a differential amplifier.

7. The automatic light intensity control system of claim 6 wherein said means for applying a control current to said drive motor includes a complimentary output driving amplifier which is responsive to said differential amplifier output signal to produce a drive current of a predetermined magnitude to the drive motor to move the adjustable light intensity control means in the direction required to obtain the desired light intensity of the optical image on the surface of the electronic imaging means of the video camera and to produce a feedback voltage equal to the back EMF of the drive motor as the feedback signal.

8. The automatic light intensity control system of claim 2 wherein said feedback circuit includes means for compensating for the viscous damping and error rate damping of said adjustable rotatable iris, said drive motor and said gear mechanism.

9. The automatic light intensity control system of claim 8 wherein said adjustable rotatable iris and drive motor are located remotely from said automatic light intensity control circuit.

10. An automatic iris control system adapted to be connected between an optical input device having a light source and which produces a dynamic optical image having spikes of short durations of high intensity of reflected light and variations of light intensity due to variations in distance of the subject from a light source and a video camera having an electronic imaging means which is responsive to the dynamic optical image applied to the electronic imaging means of the video camera for producing a video signal which includes a video information signal having spikes representative of short durations of high intensity of reflected light, said automatic iris control system comprising an adjustable iris including a drive motor positioned between a said video camera electronic imaging means and a said optical input device to dynamically vary the intensity of the optical image applied to said video camera electronic imaging means;

a light intensity level programming means for establishing a desired light intensity level at which said optical image is incident upon the surface of said electronic imaging means of the video camera and for producing a command reference signal; and an automatic iris control circuit for receiving the video signal produced by a said video camera, said automatic iris control circuit including a low gain amplifying means responsive to the video information signal to produce a low level amplified video information signal having the input peaks as a part thereof;

a weighted video peak response detector responsive to the amplified video information signal to produce a light intensity information signal having a level which is representative of the weighted peak average of the video information signal including the impulse peaks; and a feedback circuit including a comparator and means for applying a control current to said drive motor of the adjustable iris, said comparator being adapted to receive as inputs thereto a command reference signal from the light intensity level programming means, the light intensity information signal and a negative feedback signal, said comparator being responsive to the input signals for producing as an output therefrom a current control signal of a predetermined magnitude and direction and applying said current control signal to said means for applying a control current to said drive motor to cause said drive motor to open said iris to increase the light intensity of the optical image incident upon the surface of the electronic imaging means of the video camera when the level of the light intensity information signal is less than the level of the command reference signal and to close said iris to decrease the light intensity of the optical image upon the surface of the electronic imaging means of the video camera when the level of the light information intensity signal is greater than the level of the command reference signal and to produce a negative feedback signal representing the magnitude and direction of said difference, said feedback circuit producing said control current signal in a magnitude and direction to dynamically control the direction and position of the drive motor to adjust the iris to apply the optical image at substantially the same light intensity on the surface of the electronic imaging means of the video camera independent of the variations of light intensity from the subject.

11. A method of controlling the light intensity of an optical image received from an optical input device and applied to the surface of an electronic image means of a video camera, which optical image results in video frame having only a portion thereof containing said optical image with the remaining portion of the video frame being unimagined, the optical input device and video camera having an adjustable iris and associated drive motor located therebetween which is adapted to vary the light intensity of the optical image on the electronic imaging means, said method comprising sampling the video information signals of a horizontal scan line having video signal information which includes voltage signals representative of the unimagined portion of a video frame and of the various intensity levels of the optical image within a video frame;

converting the sampled video information signals to a direct current voltage;

applying the direct current voltage to a weighted video peak response detector circuit having a resistor and capacitor which integrates the direct current voltage with a predetermined time constant established by said resistor and capacitor to produce an analog voltage which is a light intensity information signal;

comparing said light intensity signal with a command reference signal representative of a desired intensity level, and a negative feedback signal to produce a control current signal of a predetermined magnitude and direction;

applying said control current signal to a power control amplifier for producing in response to said control signal a drive current of a predetermined magnitude and direction and applying the same to said drive motor and for producing and applying a negative feedback signal representative of the magnitude and direction of said drive current to said comparator, said power control amplifier applying said current to said drive motor to rotate said iris in a direction required to vary the light intensity of optical image on the surface of the electronic imaging means in a direction which makes the light intensity information signal equal to the command reference signal.

12. The method of claim 11 further comprising the step of setting the command reference signal at a selected voltage within a predetermined range of voltages to establish the light intensity of an optical image at a desired intensity level.

* * * * *